United States Patent
Yang et al.

(10) Patent No.: US 6,996,061 B2
(45) Date of Patent: Feb. 7, 2006

(54) DYNAMIC SCHEDULING FOR PACKET DATA NETWORK

(75) Inventors: Jen-Shun Yang, Taipei Hsien (TW); Ray-Guang Cheng, Keelung (TW); Chien-Chao Tseng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 890 days.

(21) Appl. No.: 09/790,490

(22) Filed: Feb. 23, 2001

(65) Prior Publication Data

US 2002/0041566 A1 Apr. 11, 2002

(30) Foreign Application Priority Data

Aug. 11, 2000 (TW) .................................. 89116183 A

(51) Int. Cl.
*G01R 31/08* (2006.01)

(52) U.S. Cl. ........................ 370/233; 370/234
(58) Field of Classification Search ................ 370/230, 370/230.1, 231, 232, 233, 234
See application file for complete search history.

(56) References Cited

U.S. PATENT DOCUMENTS

| | | | | |
|---|---|---|---|---|
| 5,982,813 A | * | 11/1999 | Dutta et al. ............... | 375/219 |
| 6,335,922 B1 | * | 1/2002 | Tiedemann et al. ......... | 370/335 |
| 6,400,685 B1 | * | 6/2002 | Park ........................... | 370/232 |
| 6,687,226 B1 | * | 2/2004 | Galyas ....................... | 370/231 |

* cited by examiner

*Primary Examiner*—Duc Ho
*Assistant Examiner*—Thien D Tran
(74) *Attorney, Agent, or Firm*—Birch, Stewart, Kolasch & Birch, LLP

(57) ABSTRACT

A method for dynamic division of the radio capacity in a Time Division Multiple Access (TDMA) system between different packet radio services. Each packet radio service is composed of packets with the same or different priority. Several MSs can share a time slot. Information regarding to the interference for each MS is obtained by a request from a mobile station (MS) or through a traffic measurement at the base transceiver station. This information, along with the QoS contract, is used as criteria in allocating more time slots to packet radio service. A framework of dynamic scheduling for mobile communication (DSMC) comprising a Channel Codec Unit (CCU) and a Packet Control Unit (PCU) determines the service rate upon the required QoS of a user and the interference level.

16 Claims, 6 Drawing Sheets

$D_{e,l}^c$ :Requested delay bound
$R_p$ :Requested peak data rate
$R_m$ :Acceptable minimum data rate m:No. of blocks being transmitted(may be in a range)
$R_p'$:Supported peak data rate
p:Requested priority i:User id
R:Current data rate
IntLex:Interference Level

DYNAMIC SCHEDULING FOR PACKET DATA NETWORK

BACKGROUND OF THE INVENTION

1. Field of the Invention

The present invention relates to a method for dynamically scheduling in a telecommunication service, and especially to a method for dynamic division of the radio capacity in a Time Division Multiple Access (TDMA) system between different packet radio services.

2. Description of Related Art

The global system for mobile communications (GSM) has been disseminated all over the world since 1992. Due to the system complexity, only a limited set of basic speech and circuit-switched data services were specified in phase 1 GSM recommendations. GSM is entered into phase 2+ development on 1996. The major objective of phase 2+ is to build off the huge investments made and prepare GSM for the future mobile telecommunication market by introducing new services.

General packet radio service (GPRS) is one of the new services introduced in the GSM phase 2+ standard. GPRS is designed to support the intermittent and bursty data transfer according to the feature of occasional transmission of the large multimedia data. It uses a packet-mode technique to transfer high-speed (120 kb/s) and low-speed data and signaling over the existing GSM network. Strict separation between the radio subsystem and network subsystem is maintained, allowing the network subsystem to be reused with other radio access technologies by the next mobile communication generation. Applications based on standard data protocols are supported, and internetworking is defined with IP networks and X.25 networks. Specific point-to-point (PTP) and point-to-multipoint multipoint (PTM) services are supported. Four service levels are supported. GPRS, which is compatible with GSM architecture, is designed for the quick reservation of resources to begin the transmission of packets, typically from 0.5 to 1 second. The main idea of the GPRS service is to allocate bandwidth resource on demand. This operating feature is defined as a "capacity on demand mode".

FIG. 1 shows the protocol stack of the transmission plane for GPRS. The Radio Link Control/Medium Access Control (RLC/MAC) protocol in the GRPS is tailored to the Frequency Shift Modulation (FSM) requirements. Basically, uplink and downlink are independent and asymmetric channel resources. It is necessary to allow Mobile Stations (MSs) to simultaneously transfer packets in both directions in imbalanced data traffic.

The RLC protocol uses a selective ARQ mechanism to handle the retransmission of error RLC/MAC blocks while the MAC protocol uses a slotted-ALOHA-based packet reservation mechanism. A connection is identified as a Temporal Block Flow (TBF). Different QoSs can be achieved by allowing MS to use more than one TDMA time slot in a frame.

[Uplink Data Transfer]

An MS initiates a packet transfer by making a packet channel request on PRACH or RACH. The network responds on PAGCH or AGCH, respectively. The multi-slot channel reservation scheme allows the MS to reserve at least one TDMA time slot in a frame, and thus reduces the transmission delay across the air interference. The bandwidth can be allocated to MSs depending on the number of available PDCHs, the multi-slot capability of the MS, and the current system load, etc.

The BSS sends a 3-bit Uplink State Flag (USF) in all downlink RLC/MAC blocks to indicate which MS can use the next uplink radio block on the same time slot. For example, USF='111' indicates the corresponding uplink radio block containing PRACH, and USF=R1/R2/ . . . /R7 are used to reserve the uplink for different MSs[1].

[Downlink Data Transfer]

A BSS initiates a packet transfer by sending a packet-paging request on the PPCH or PCH downlink. The MS responds to the page by initiating a page response procedure very similar to the packet channel request procedure as mentioned above. Since an identifier named 'Template Flow Identifier' (TFI), which is one-to-one corresponding to a TBF, is included in each radio block. The TFI is used to multiplex radio blocks, destined to different MSs on the same PDCH downlink.

In GPRS, several users (or MSs) can share one physical channel (i.e. time slot) and the Base Station (BS) needs a traffic-scheduling algorithm to decide the priority of each MS for transmission its packets based on the requested quality of services (e.g. packet error rate). However, the signal quality received by a Mobile Station (MS) is varied with time in wireless environment and it makes the traffic-scheduling algorithm difficult. Therefore, a proper traffic-scheduling algorithm has to consider about interference region.

The QoS adjustment may be achieved by applying different coding-schemes (e.g. convolution-coding rate 1/2、2/3、3/4 and 1). However, besides the high complexity in MS, the main problem for such a QoS adjustment approach is the long response time required for exchanging the signals due to the negotiating of a new code rate between MS and BS. Also, such a QoS adjustment may not respond to the interference changing pace when an MS moves at high speed.

SUMMARY OF THE INVENTION

Accordingly, an object of the invention is to provide a Dynamic Scheduling for Mobile Communication (DSMC), which has the efficient bandwidth allocation so as to increase system capacity.

Another object of the invention is to provide a DSMC, which guarantees the transmission latency bound.

Another object of the invention is to provide a DSMC, which fulfills the requirement of a variety of services, such as multimedia communication services.

The DSMC of the present invention is a scheduling architecture to provide circumstantial service strategies, dynamic resource management, and channel quality dependence rate control. It can conform to a variety of QoS requirements in GPRS without changing the convolution-coding rate. By using the Self-clocked Fair Queuing (SCFQ) in DSMC, the scheduler of DSMC can adjust the service rate (weight) of a particular session in accordance with the channel quality. Therefore, if the channel quality is good, the session will receive more service efforts. Otherwise, the scheduler will lower its service rate to avoid the waste of bandwidth.

Since service requirements for multimedia communication are quite varied and mobile movement is at random and unpredictable, a session cannot use a constant service rate for whole transmission time. The reason is that more data is dispatched and the more retransmission incurred while an MS is within high interference region. Hence, two circumstantial scheduling strategies of the invention are provided to conquer the problem above:

Strategy A: Channel quality dependence rate control with fixed resource allocation Strategy B: Channel quality dependence rate control with dynamic resource allocation In strategy A, a connection constantly uses a low service rate when an MS is within a high interference region, and a high service rate within low interference region. Here, the high and low service rates are calculated at a connection setup time of the session. In strategy B, a connection also uses the low service rate as mentioned in strategy A, but instead of using the constant high service rate within a low interference region, the dynamic high service rates are adjusted by the scheduler after connection setup. Both strategies can increase the bandwidth efficiency because the unused bandwidth can be reallocated to other users when MS resides within high interference region using the low service rate.

Further scope of the applicability of the present invention will become apparent from the detailed description given hereinafter: However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and in which.

DETAILED DESCRIPTION OF THE INVENTION

The invention provides dynamic scheduling for Mobile Communication (DSMC) for scheduling different packet service requests in a TDMA system, especially in a General packet radio service (GPRS) system. The DSMC strategy is first explained as follows.

[DSMC Strategy Descriptions]

The concept of the present invention is to adjust the service rates for Mobile Stations (MSs) during the connection setup according to their QoS requirements and the interference levels. In GPRS, error data blocks will be retransmitted at the Radio Link Control (RLC) layer. Therefore, the number of retransmitted blocks can be reduced if we reduce the service rate of a connection when the MSs is within a high-interference region. The remaining bandwidth can be allocated to MSs located at a low-interference region to increase the bandwidth efficiency. As soon as the MS returns to a low-interference region, it will be assigned a higher service rate in order to resume the lost bandwidth. Considering the resource allocation time and implementation complexity, two strategies of 'Channel quality dependence rate control' are disclosed.

In strategy A, resources (bandwidth and buffers) are admitted and allocated to a new Temporal Block Flow (TBF) at the connection setup phase. The high- and low-service-rates are both fixed within a same cell.

Figure 1:
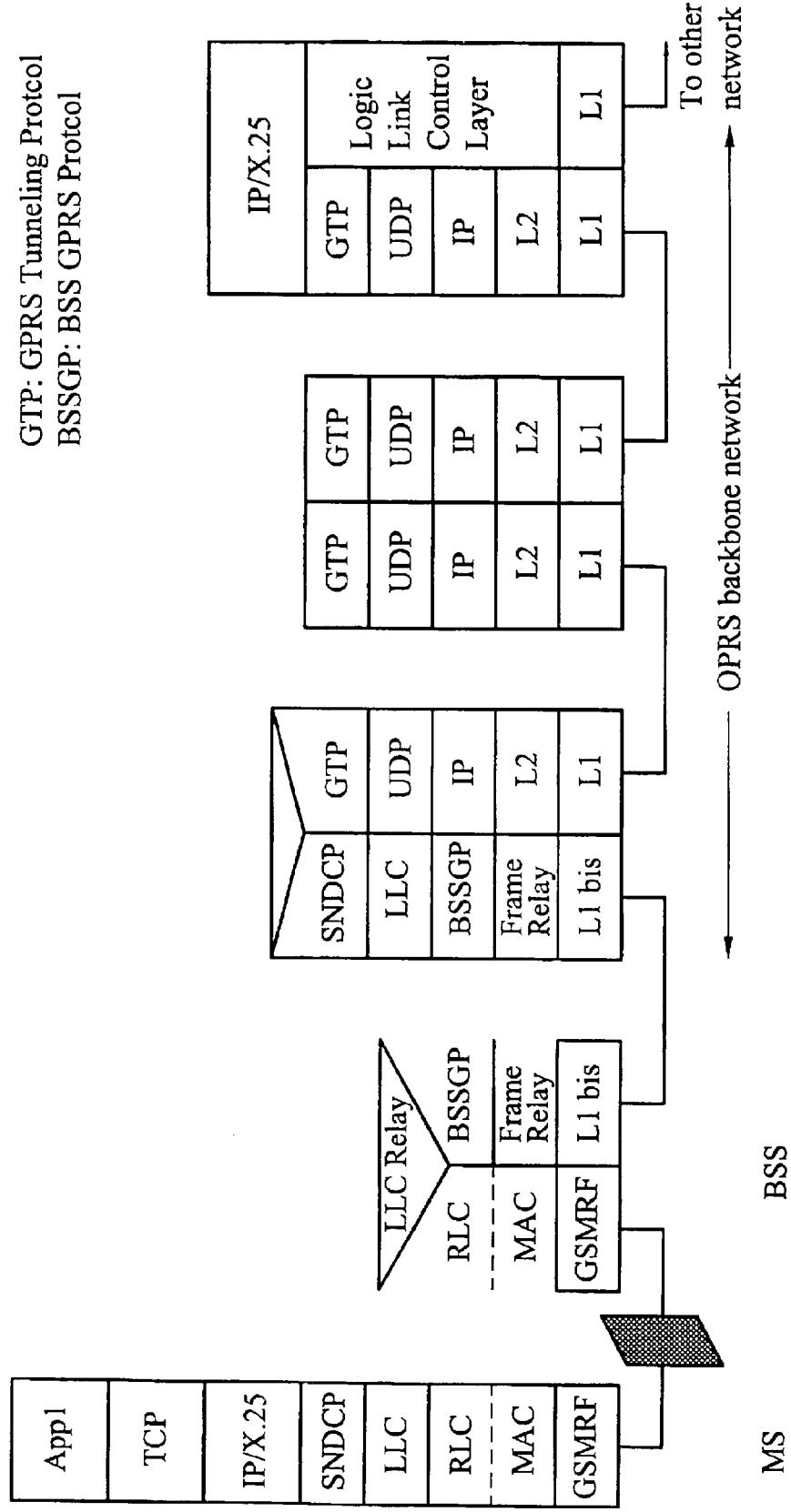
FIG. 1 is a schematic diagram of a typical GRPS transmission plane.
Figure 2:
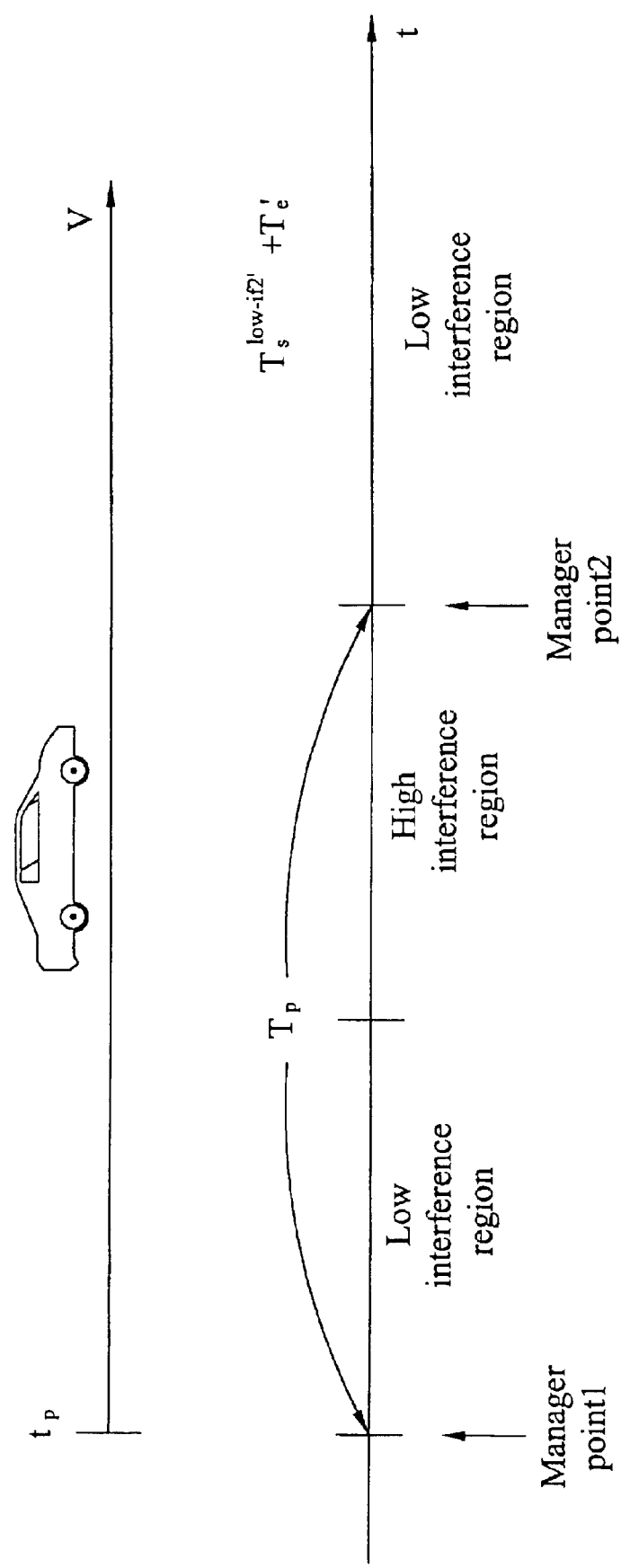
FIG. 2 is a schematic diagram of strategy B of an interference condition of the invention.

In strategy B, refer to FIG. 2, a schematic diagram of strategy B of an interference condition of the invention, two managing time points are used in controlling and allocating resources.

As shown in FIG. 2, resources are admitted and allocated at the two managing time points: At managing point 1 ($t_p$), a connection is setup, the scheduler decides the low-service-rate for the high-interference-region and an initial high-service-rate for the first low-interference-region. At managing point 2, the interference condition changes from a high-interference-region to a low-interference-region; the scheduler decides a new service rate for low-interference-region in order to meet the delay bound. Thus, strategy B is more flexible than strategy A because the former represents a realistic interference result with dynamic allocation of resources during data transmission. However, the price paid is higher complexity on allocation. The details of strategy B will be described later.

[DSMC Architecture Descriptions]

Figure 3:
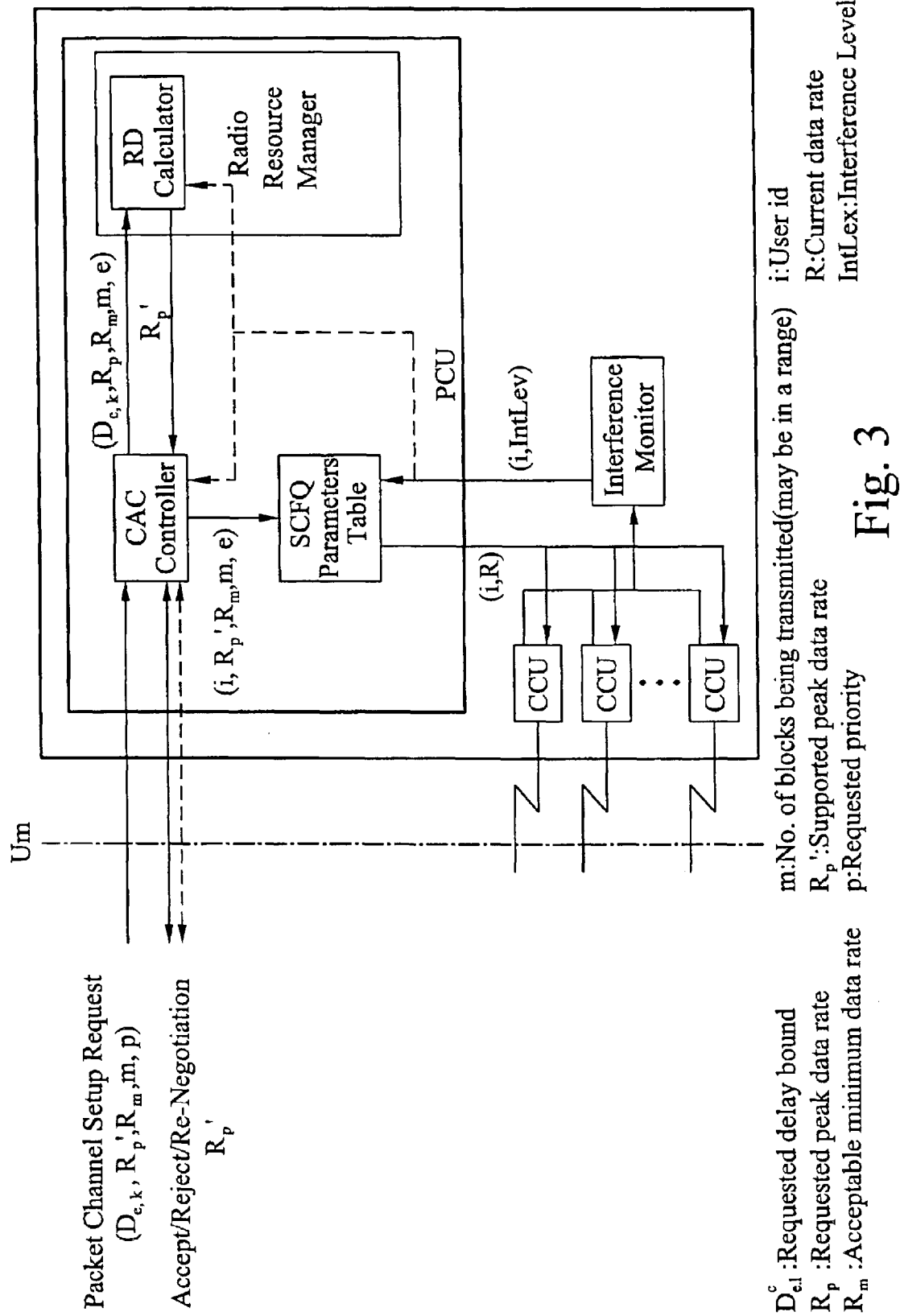
FIG. 3 illustrating the functional block diagrams of implementing a DSMC block diagram of the invention.

Refer to FIG. 3, illustrating the functional block diagrams required to implement the invention.

In FIG. 3, a Channel Codec Units (CCUs) and a Packet Control Unit (PCU) are involved.

Figure 6:
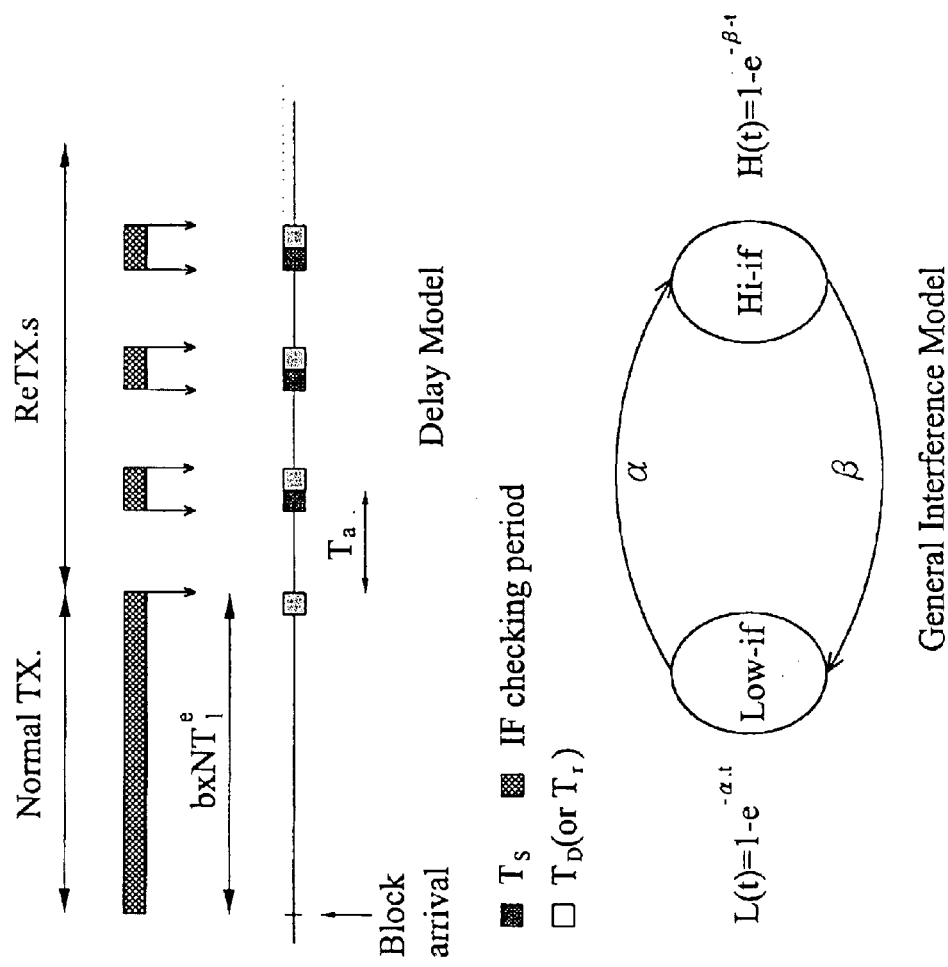
FIG. 6 is a schematic diagram of a delay model and an interference model.

As shown in FIG. 3, the functions inside the CCU comprises the channel coding and the radio channel measurement, e.g., received quality/signal level. The PCU is responsible for channel access control functions, e.g., access request/grant, as well as radio channel management functions, e.g., channel congestion control. A Connection Admission Control (CAC) Controller in the PCU is responsible for the channel access control related issues. An MS may request a TBF by specifying its QoS requirements in terms of a set of parameters ($D_{e,k}$, $R_p$, $R_m$), its priority e, as well as the number of blocks m being transmitted to the CAC Controller. The notation $D_{e,k}$ represents a requested delay-bound of a session k with priority e. Upon the received request with desired parameters, the CAC Controller forwards the parameters to a Rate Decision (RD) Calculator of a Radio Resource Manager. The RD Calculator will find out the maximum data rate $R_p'$ that can be supported by a Base Station (BS) by considering the existing higher priority services, the delay bound $D_{e,k}$, and an assumed user interference model (FIG. 6). The interference model is based on a two-state Markov chain with transition probabilities α and β. The parameters α and β can be collected via a user behavior database and can be dynamically updated. Details about the algorithms employed in the RD Calculator will be described later.

After receiving the $R_p'$ from the RD Calculator, the CAC Controller can optionally accept, reject or re-negotiate with the MS. If the connection is accepted, the CAC Controller is assigned an internal ID i for indexing and stores the parameters of ($R_p'$, $R_m$, m, e) to an Self-clocked Fair Queuing (SCFQ) Parameter Table. Based on the interference level IntLev indicated by an Interference Monitor, the CCU determines a service rate for the request according to the SCFQ scheduling algorithm. In this figure, the solid arrow indicates the signal flowing for Strategy A while the solid plus dotted arrow is for Strategy B. The difference between the strategies A and B is only that the latter has to update the service rate by the RD Calculator during the connection according to the interference level and, optionally, to inform the CAC Controller to re-negotiate with the MS.

Here, we use the GPRS system as an example to illustrate the application of the present invention. In GPRS standards, five scheduling priority levels are supported. The priority levels include a signal priority level (the assigned highest priority level) and four data priority levels. The DSMC block scheduling architecture is shown in FIG. 4.

Figure 4:
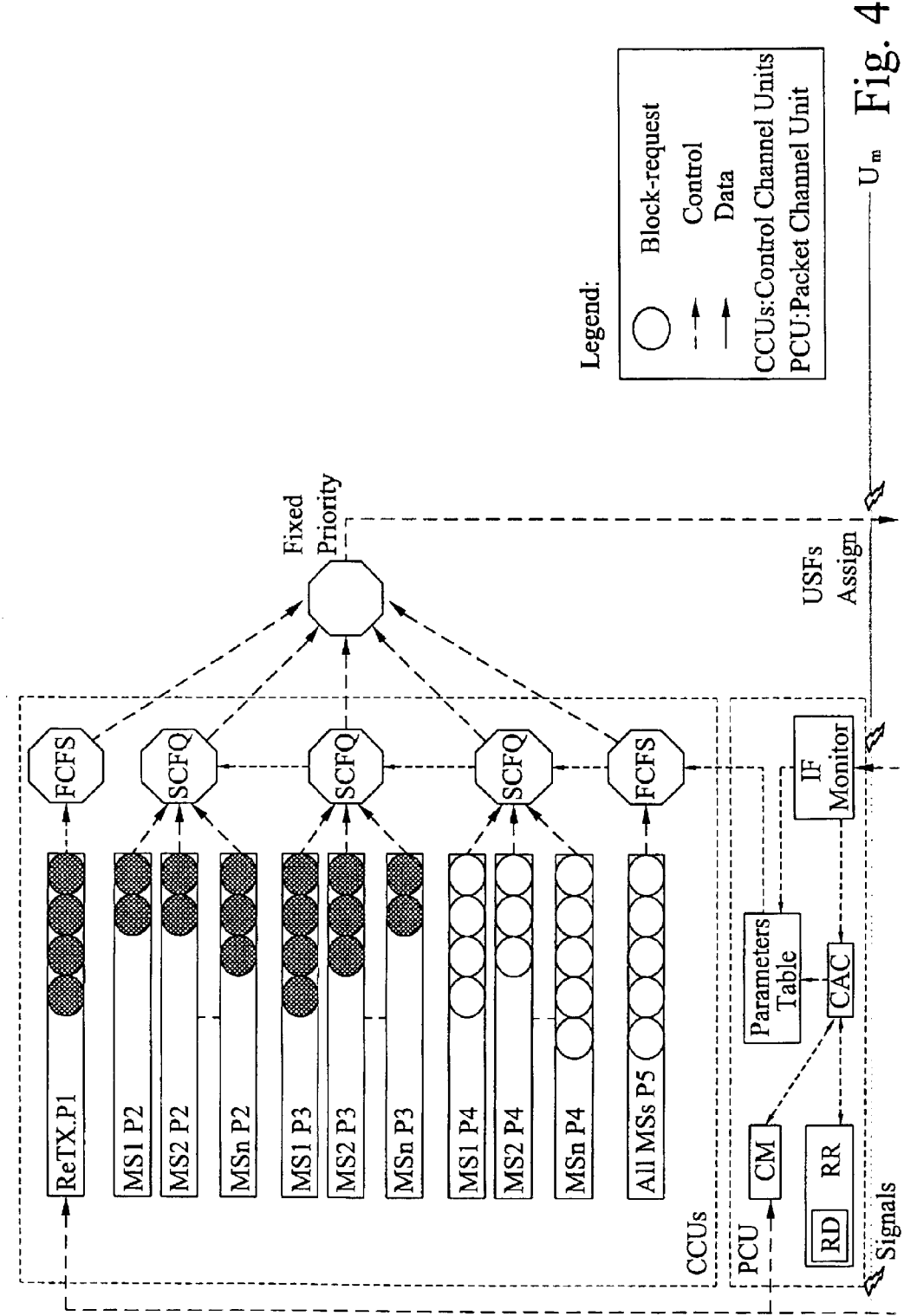
FIG. 4 is a block diagram of a scheduler architecture of the invention.

As shown in FIG. 4, five request servers are presented and each is responsible for scheduling each priority level. The highest priority level is to use the process of the retransmission blocks as well as signaling messages. An MS may issue data block requests to priority levels P2~P5. The priority levels P2~P4 use the SCFQ scheduling algorithm for the service request to meet the delay constraint of a data block. The highest and lowest priority levels are served according to a first-come-first-served (FCFS) mechanism. Higher priority data block requests, if present, can prevent the lower priority data block from entering the request server, but it is non-preemptable when a lower priority data block is serving. The five priority server requests are supported by the Parameter Table (PT), which contains the QoS data for scheduling. The Radio Resource Manager (RR) element can adjust the service rate dynamically, by negotiating with the Connection Admission Control (CAC). The CAC and CM elements are responsible for the granting and the signaling of the TBF connection, respectively. The Interference (IF) Monitor is responsible for noting the CAC and PT when the IF region is changed. In the BS, the scheduling result can be applied to the uplink or downlink transmission. To indicate the owner of the next uplink radio block on the same slot, the BS can send the uplink status flag (USF) using the downlink RLC/MAC blocks.

[The Rules of Connection Admission Control]

The CAC element is used to handle the TBF connection requests. The major factor that affects the acceptance/rejection decision is the requested QoS. For the mobile requesting for packet transfer, an MS sends out a TBF connection request, including QoS specification, to the BSS. The CM element establishes a TBF connection if the QoS specification in TBF connection request can be granted by the CAC element. The detection of the interference region changed is also handled by the CM element via the measurement reports sending from the signaling channel.

The QoS specification is a range between the basic QoS (minimum rate) and the best QoS (peak rate) defined in the traffic specification (T_spec). The actual working QoS (service rate) could be any value within this range. In DSMC, the minimum rate is assigned to a TBF connection as the low-service-rate when an MS reside in a high interference region. However, when an MS reside in a low interference region, the RR element calculates the high-service-rate for the MS. The calculation is based on the delay bound that specifies in the resource specification (R_spec.). Therefore, the bandwidth reserved for a TBF connection will be divided into two parts: the basic allocation part (BAP) and the adaptive part (AdP). The BAP supports the minimum service rate, whereas the AdP is a pre-allocated bandwidth for the high-service-rate within the range of peak rate to minimum rate. The unused bandwidth in AdP can be reallocated to other users. Two service rate decision (RD) algorithms described below are used to find the high service rate within low interference region in strategy A and strategy B, respectively.

[Transmission Delays]

Three delays are considered in calculating the high-service-rate: the SCFQ maximum delay of the same priority, the maximum delay contributed by higher priority classes, and the error re-transmission delay.

1. Same Priority SCFQ Maximum Delay

In DSMC, packets in multiple queues are served in a non-decreasing order that is sorted in accordance with the virtual finish-time of the packet at the head of each queue. Thus, a packet belonging to a particular session has to wait for another packet for transmitting from other session before it can be transmitted.

For considering a set of sessions of same priority (priority e), the maximum delay $d_k^e$ for the data block from session k ($\forall$ k $\in$ e) can be obtained by $$d_k^e = \frac{L_k^e}{r_k^e} + \frac{1}{C_i} \sum_{j \in \kappa, j \neq k} L_j^e, \quad (1)$$

where
$C_i$: Link (band) i capacity (bps),
$\kappa_e$: the set of backlog sessions for priority e,
$r_k^e$: mean service rate (bps) of session k of priority e,
$L_k^e$: the block size (bits) of session k of priority e.

The first term at the right of equation (1) represents the service duration of a data block for session k, whereas the second term is the worst delay contributed from each other session belonging to priority e.

2. Mean Error Re-transmission Delay in a Block

The re-transmission delay of an error block consists of two time periods: the waiting time for ACK (NAK) signal and the time to retransmit the error block. These two time period are denoted as $T_a$ and $T_r$ respectively. All error-retransmission requests are buffered in a retransmission session. The retransmission session has the highest priority level. The BERs (after applying the protection of convolution coding) of high and low interference region are represented by $b_{Hi}$ and $b_{Lo}$ respectively. Without loss generalization, we assume that the output block size and the coding rate are fixed in the convolution-coding scheme. The block size is denoted as L. For any given block, its successful re-transmission rate can be analyzed as follows:

$p = P(\text{succcessful transmited a block within high IF region})$ $= \binom{L}{0} \cdot b_{Ht}^0 \cdot (1-b_{Ht})^L$ and $r = P(\text{successful transmited a block within low IF region})$ $= \binom{L}{0} \cdot b_{Lo}^0 \cdot (1-b_{Lo})^L.$ Therefore, the mean error re-transmission time for the low interference region can be calculated as statement (2) if the re-transmission follows geometric distribution.

$$E_{mean}^{low-if} = (T_r + T_a) \cdot \sum_{k=1}^{\infty} k \cdot (1-r)^k \cdot r = \frac{1-r}{r}(T_r + T_a) \quad (2)$$

Similarly, the same procedure can be applied to calculate the mean error re-transmission time for high interference region.

3. Maximum Delay Contributed by Higher Priority Classes

In this section, we consider a fixed priority scheduling discipline. In other words, any session that has the priority level higher than the dedicated priority level must be served up before a ready-to-serve block with the dedicated priority level is dispatched for serving. We named the session of dedicated priority level as the session k of priority e. The set of higher priority levels is denoted by h. $C_i$ denotes the link capacity of the radio band (channel) i. For a given session j∈g where g∈h, let $A_{g,j}[\tau,\tau+t]$ denote the amount of traffic arrivals in the time interval $[\tau,\tau+t]$ for the session j of priority g. The most traffic entering a higher priority level queue is expressed in term of an envelope function as follows:

$$A_{g,j}[\tau,\tau+t] \leq A^*_{g,j}(t), \forall t \geq 0, \forall \tau \geq 0. \tag{3}$$

If an envelope function has only one linear segment, the session traffic is referred to as leaky-bucket constrained.

$$A^*_{g,j}(t) = \sigma_{g,j} + \rho_{g,j} t, \forall t \geq 0. \tag{4}$$

According to the scheduling discipline stated above, the retransmission packet has the highest priority level. Hence, after observing the system for a long time, the error-retransmission traffic during period $(t_1,t_2)$ is denoted as $A_{1,1}[t_1,t_2]$ which also conforms to the leaky-bucket constrained as shown in statement (5). The maximum serving traffic for each session is equal to the output of a regulator, thus the error-transmission probabilities of served block are $(1-r)$ and $(1-p)$ for an MS within low- and high-interference region, respectively.

$$A_{1,1}[t_1, t_2] \leq A^*_{1,1}(t_2 - t_1) = \tag{5}$$

$$L \times \sum_{\substack{s \in \text{all data} \\ \text{priority levels}}} \left\{ \left[ \frac{\sum_{\text{session } j \in s} \sigma_{s,j} + \rho_{s,j} \times (t_2 - t_1)}{L} \right] \times (1-p) \times P_{Ht-if} + \left[ \frac{\sum_{\text{session } j \in s} \sigma_{s,j} + \rho_{s,j} \times (t_2 - t_1)}{L} \right] \times (1-r) \times P_{Low-if} \right\},$$

The ceiling-operators are used in statement (5) because the block size is fixed. In addition, we assume all priorities with same BLER and interference distributions.

Figure 5:
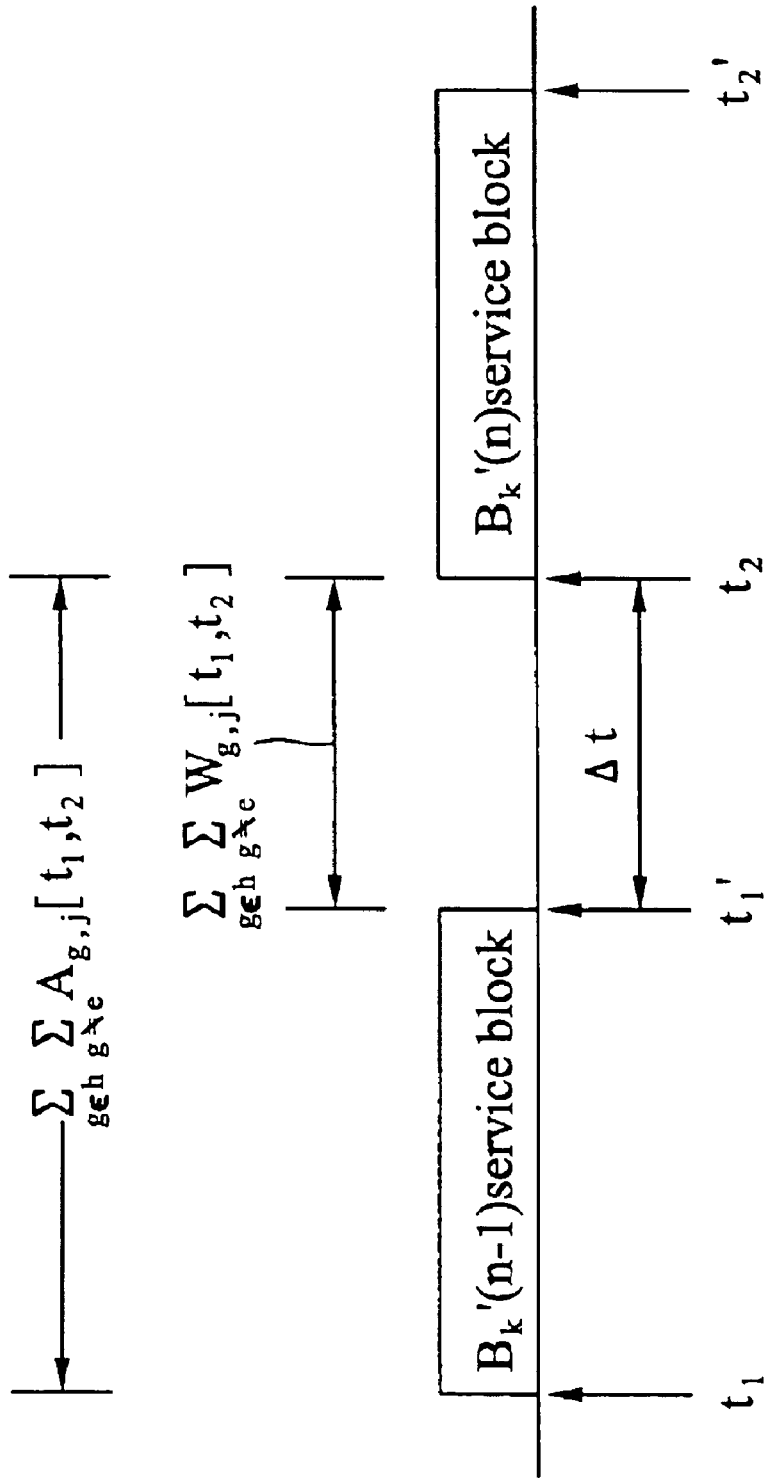
FIG. 5 is a schematic diagram of the delay caused by the higher priorities.

Refer to FIG. 5. For convenience, let $B_k(n)$ denote the $n^{th}$ data block to be dispatched to the server, where any k∈e, k could be any session belong to priority e. The delay of serving the traffic of all higher priority levels is denoted as $\Delta t$, such as shown in FIG. 5. The traffic service of all higher priority levels has to be finished within the time $\Delta t$. Thus, for any session j with priority g higher than priority e, we can find that the arrival traffic during period $(t_1,t_2)$, $A_{g,j}(t_1,t_2)$, is equal to the amount of traffic served during period $(t_1',t_2)$, $W_{g,j}(t_1,t_2)$, such as shown in equation (6).

$$A_{g,j}[t_1,t_2] = W_{g,j}[t_1',t_2], \forall t_1 > t_2, t_2 \geq 0 \tag{6}$$

where $t_1'$: the epoch of end of serving $B_{k'}$ (n−1) block for the any session k' of priority e $W_{g,j}[t_1',t_2]$: the amount of traffic that served in time interval of $[t_1',t_2]$ for the session j of priority g,g∈h.

Obviously, by substituting statement (3) to statement (6), we can get statement (7).

$$0 \leq A^*_{g,j}(t_2-t_1) - W_{g,j}[t_1',t_2], \forall t_2 > t_1, t_2 \geq 0. \tag{7}$$

Now, the statement (7) can be rewritten as statement (8) if the summation of all higher priority levels and the substitution of the statement (4) make $$\sum_{g \in h} [W_{g,j}[t_1', t_2]]$$

equal to $C_i \times \Delta t$ because of the fixed priority assumption.

$$0 \leq A^*_{1,1}(\Delta t + t_1' - t_1) + \sum_{l \in h, l \neq 1} \left[ \sum_{\text{session } j \in i} \sigma_{i,j} + \rho_{i,j} \times (\Delta t + t_1' - t_1) \right] - \tag{8}$$

$$C_i \times \Delta t, \forall t_1' > t_1, t_1', t_1 \geq 0.$$

According to the definition, the service time for $B_{k_e}(n-1)$ is:

$$t_1' - t_1 = \frac{L}{C_i}, \text{ where session } j \in \kappa_e, j \neq k \tag{9}$$

Finally, we get the solution of $\Delta t$ after solved the statement (8).

[Normal Transmission Delay]

In this section, we define the normal transmission delay for a data block $B_k(n)$ does not include the re-transmission delay, but the same priority SCFQ maximum delay and the delay from higher priorities, as shown in statement (10).

$$(NT^e_k)^{low-if} = (d^e_k)^{low-if} + \sum_{v \in \kappa_e} \Delta t_v \leq (NT^e_k)^{hi-if} = (d^e_k)^{hi-if} + \sum_{v \in \kappa_e} \Delta t_v \tag{10}$$

where $\Delta t_v$: the higher priorities' delay when a block of session v is serving, $\forall v \in \kappa_g$ Strategy A of the Invention:

In strategy A, the scheduler adjusts the service rate by fixed levels (two levels of high and low service rates are decided by the RD algorithm at the connection setup time) in accordance with the interference strength to obtain the benefits of lower error re-transmission delay and lower BLER. By lowering the error re-transmission delay, the schedulers can upswing bandwidth efficiency without wasting the bandwidth for re-transmission in bad channel quality.

1. Delay Evaluations

Refer to FIG. 6. We assume the general interference model by IPP (Interrupted Poisson Process) model with transition probabilities of $\alpha$ and $\beta$. Hence, the duration within the low-interference region and the high interference region are both exponentially distributed with $1-e^{-\alpha \cdot t}$ (denoted by L(t)) and $1-e^{-\beta \cdot t}$ (denoted by H(t)), respectively.

Moreover, the stationary probability of low interference region is denoted as $P_{Low-if}$, whereas the stationary probability of high interference region is denoted as $P_{Hi-if}$.

As further shown in FIG. 6, the Delay model consists of two phases of delays: the "predictive" normal transmission (normal notation TX.) delay and "predictive" re-transmission (Re-TX.) delay. It is called "predictive" because the delays are calculated by RD algorithm before data block transmission. In the predictive normal TX., a new arrival data block for session k of priority e wait for the dispatch until all the proceeding data blocks in the same session is served. Here we use b to represent the mean queue length in blocks, thus the waiting-time of predictive normal TX equal to $b \cdot NT_k^e$, where $NT_k^e$ can be either $(NT_k^e)^{low-if}$ or $(NT_k^e)^{hi-if}$ with probability of $P_{Low-if}$ and $P_{Hi-if}$ respectively. In predictive Re-TX., a cycle of an error retransmission time is contributed by two delays of $T_a$ and $T_r$, whereas the retransmission procedure will continue until the receiver receives the data block successfully.

2. Mean Queue Length Analysis

We assume the leaky bucket traffic policy used in each input traffic, by little's result, the mean queue length in block when a new data block arrival, equal to the block arrival rate multiple to the mean service time for a block as shown in following statement.

$$b = \frac{\rho_{k,e}}{L_k^e} \cdot [(NT_k^e)^{low-if} \cdot P_{Low-if} + (NT_k^e)^{hi-if} \cdot P_{Hi-if}] \quad (11)$$

Hence, the mean block time (waiting time+service time) W for a given block $B_k(n)$), $\forall k \in e$, can be calculated as statement (12).

$$W = b \cdot [(NT_k^e)^{low-if} \cdot P_{Low-if} + (NT_k^e)^{hi-if} \cdot P_{Hi-if}] \quad (12)$$
$$= \frac{\rho_{k,e}}{L_k^e} \cdot [(NT_k^e)^{low-if} \cdot P_{Low-if} + (NT_k^e)^{hi-if} \cdot P_{Hi-if}]^2$$

3. Probability of Interference Model

Consider a block to be served within one of two states of a hi-if region and a low-if region. Initially while an MS is located within a low-if region, a block arrives and waits for a time $Z_1$ within this low-if region. The MS then moves to a high-if region and remains in this high-if region for a time $Y_1$. Before the block is dispatched for serving, the MS moves first to another low-if region for a time $Z_2$; then to another high-if region for a time $Y_2$; and so forth.

We suppose that the random vectors $(Z_n, Y_n)$, $n \geq 1$, are independent and identically distributed. Hence, both the sequence of random variables $\{Z_n\}$ and the sequence $\{Y_n\}$ are independent and identically distributed; but we allow $Z_n$ and $Y_n$ to be dependent. In other words, when the MS moves to a low-if region, the condition will re-start again, but when the MS moves to a high-if region, we allow the duration of the high-if region time to depend on that of the immediately previous low-if region time (see FIG. 2).

Let L be the distribution of $Z_n$, H the distribution of $Y_n$, and F the distribution of $Z_n+Y_n$, $n \geq 1$, i.e. F is the convolution sum of L and H. Let $P_{hi-if}^{LS}(W)$ represent the probability of a block servicing in a high-if region but arriving in a low-if region and waiting for time W. The other three probabilities as follows may be deduced by analogy for the symbolic representation. We show the solutions of the four probabilities during normal transmission phase as follows.

$$P_{low-if}^{LS}(W) = [1 - L(W)] + \int_0^W [1 - L(W-y)]d\left[\sum_{n=1}^{\infty} F_n(y)\right] \quad (13)$$

$$P_{hi-if}^{LS}(W) = 1 - P_{low-if}^{LS}(W)$$

$$P_{hi-if}^{HS}(W) = [1 - H(W)] + \int_0^W [1 - H(W-y)]d\left[\sum_{n=1}^{\infty} F_n(y)\right]$$

$$P_{low-if}^{HS}(W) = 1 - P_{hi-if}^{HS}(W)$$

4. Predictive Normal Transmission Delay

For an uplink service, an MS may send its block request anywhere; no matter if it is in a high interference region or in a low interference region. Hence, a new arrival block may enter its queue with the probability $P_{Low-if}$ within a low interference region or the probability $P_{Hi-if}$ within a high interference region. However, if this condition occurs, then the block may be serviced within a low interference region with the probability $P_{low-if}^{LS}(W)$, and within a high interference region with the probability $P_{hi-if}^{LS}(W)$. We conclude the normal transmission delay as follows.

$$NT\_Delay = \quad (14)$$
$$P_{Low-if} \cdot [b \cdot (NT_k^e)^{low-if} \cdot P_{low-if}^{LS}(W) + b \cdot (NT_k^e)^{hi-if} \cdot P_{hi-if}^{LS}(W)] +$$
$$P_{Hi-if} \cdot [b \cdot (NT_k^e)^{hi-if} \cdot P_{hi-if}^{HS}(W) + b \cdot (NT_k^e)^{low-if} \cdot P_{low-if}^{HS}(W)]$$

5. Predictive Mean Re-transmission Delay

For the duration of retransmission time, we also need to consider the interference conditions since the retransmission may occur alternatively in the low or high interference region. We let A denote the retransmission delay starting from a low interference region, whereas B denotes the retransmission delay starting from a high interference region. As mentioned before, the retransmission probability is 1−r when an MS is within a low interference region. The retransmission probability is 1−p when an MS is within a high interference region. Hence, with these notations, we can describe the predictive mean re-transmission delays by two cross recursive statement, A and B, in equations (15) and (16), respectively.

$$A = (1-r)\{[(T_a+T_r)+A] \cdot P_{low-if}^{LS}(T_a+T_r) + [(T_a+T_r)+B] \cdot P_{hi-if}^{LS}(T_a+T_r)\} \quad (15)$$

$$B = (1-p)\{[(T_a+T_r)+B] \cdot P_{hi-if}^{HS}(T_a+T_r) + [(T_a+T_r)+A] \cdot P_{low-if}^{HS}(T_a+T_r)\} \quad (16)$$

6. Predictive Service Rate

We combine the predictive normal transmission delay and the predictive mean re-transmission delay, and can calculate the predictive delay for a block as shown in statement (17).

$$PD = P_{Low-if} \cdot \{[b \cdot (N_k^e)^{low-if} + A] \cdot P_{low-if}^{LS}(W) + [b \cdot (NT_k^e)^{hi-if} + B] \cdot P_{hi-if}^{LS}(W)\} +$$
$$P_{Hi-if} \cdot \{[b \cdot (NT_k^e)^{hi-if} + B] \cdot P_{hi-if}^{HS}(W) + [b \cdot (NT_k^e)^{low-if} + A] \cdot P_{low-if}^{HS}(W)\} \quad (17)$$

By using equations (17) and (10), we can determine the lower bound of the high service rate. If we assume the TBF connection assigned to a session k of priority e has a QoS resource specification for m block transmission with air interface delay bound $D_{e,k}$. Then we can calculate the high service rate of the session k under the constraint of PD ≤ ($D_{e,k}$/m).

Strategy B of the Invention

In strategy B, the scheduler uses the low service rate as defined in strategy A when an MS is within high interference region, but the RD algorithm re-calculates a new high service rate once the interference region changes from high to low. The same benefits can be obtained as in strategy A. After a new service rate is used, the scheduler needs to update the virtual finish-time for all data blocks waiting in the queue of the dedicated session due to the decreasing or increasing service order in the SCFQ scheduling algorithm.

1. Delay Evaluations of Strategy B

A specification of TBF connection c in the session k of priority e includes m blocks and delay bound $D_{e,k}$. We suppose that the leaky bucket constraints of all sessions must remain unchanged during this whole TBF.

At the Managing Point 1

The delay bound when an MS is within a low-interference region is shown as follows.

$$m \times \{(NT_k^e)^{low-if} + E_{mean}^{low-if}\} \leq D_{e,k} \qquad (18)$$

where $E_{mean}^{low-if}$ represents the mean retransmission delay when an MS is within a low-interference region. The worst case will be:

$$(NT_k^e)^{low-if} = \frac{D_{e,k}}{m} - E_{mean}^{low-if} \qquad (19)$$

By substituting the equations (9) and (1) to equations (19), we can result in the service rate as follows:

$$(r_k^e)^{low-if} = \frac{L_k^e}{\frac{D_{e,k}}{m} - E_{mean}^{low-if} - \sum_{v \in \kappa_e} \Delta t_v - \frac{1}{C_i} \sum_{j \in \kappa_e, j \neq k} L_j^e} \qquad (20)$$

At the Managing Point 2

In FIG. 2, we describe the service durations for different interference regions. Here we assume that $N_p$ data blocks have been sent at the epoch of managing point 2. $T_p$ is the last time after sending $N_p$ data blocks. $T_e'$ denotes the mean backward error correction delay, where $T_s^{low-if}$ represents the new delay bound for the unsent blocks. At the managing point 2, the interference condition changes from high interference region to low interference region; thus, the scheduler need to reevaluated the new service rate in accordance with the rule that the whole service time must be bounded by the delay bound of a TBF. Thus, the time bound equation can be written as follows:

$$T_p + T_s^{low-if} + T_e' \leq D_{e,k} \qquad (21)$$

where $$T_s^{low-if} = (m-N_p) \cdot (NT_k^e)^{low-if}$$

$$T_e' = (m-N_p) \cdot (E_{mean}^{low-if})$$

Because the delay bound is a constant, two conditions need to be considered:

Condition 1: sufficient time for serving the unsent data blocks $$T_s^{low-if} \leq D_{e,k} - (T_p + T_e'), \text{ if } D_{e,k} > (T_p + T_e') \qquad (22)$$

Condition 2: insufficient time for serving the unsent data blocks. For this condition, the most aged unsent data blocks have to be dropped successively because the delay bound for the TBF connection was violated, until the condition 1 is met or the queue is emptied.

For the condition 1, we can get the result of the new service rate as statement (23) by assuming the worst case to statement (22).

$$(r_k^e)^{low-if'} = \frac{L_k^e}{\frac{D_{e,k} - (T_p + T_e')}{(m - N_p)} - \sum_{v \in \kappa_e} \Delta t_v - \frac{1}{C_i} \sum_{j \in \kappa_e, j \neq k} L_j^e} \qquad (23)$$

2. PDCH Evaluation Algorithm

The PDCH evaluation algorithm is responsible for translating the required service rate to number of required PDCH(s) for a given session. For example, as CP donates the capacity of a PDCH, $[(r_k^e)^{low-if}/CP]$ is the required PDCH(s) for the session k of priority e within a low interference region.

The present invention can be applied to the radio interface (Um) of mobile network, for example, the Channel Control Unit (CCU) and Packet Control Unit (PCU) of a GPRS system. CCU is located as the Base Transceiver Station (BTS) and PCU can be located at the BTS, Base Station Controller (BSC) or GPRS Supporting Node (GSN). The function of CM may be implemented at the CCU while the functions of CAC and RR can be implemented at the PCU. Accordingly, the bandwidth of a mobile network is efficient in the wireless transmission of a large amount of data without sacrificing the dialog quality of a session. In other words, the communication quality of a session will not be sharply reduced with the increasing interference incurred from bursting traffic in this session.

While the invention has been particularly shown and described with the reference to the preferred embodiments thereof, it will be understood by those skilled in the art that various changes in form and details may be made without departing from the spirit and scope of the invention.

What is claimed is:

1. A dynamic scheduling system for time division multiple access (TDMA) mobile communication, comprising:

an interference monitor, detecting an interference level; and a Rate Decision (RD) calculator, calculating a maximum data service rate for each block of requested sessions based on the interference level and a set of parameters for each block, said block is the transmission unit;

wherein the set of parameters comprises a requested delay bound, number of blocks being transmitted, requested peak data rate, and acceptable minimum data rate.

2. The dynamic scheduling system according to claim 1, further comprising a channel codec unit (CCU), scheduling a transmission order of the blocks based on a requested priority of each block and the maximum data service rates of the blocks calculated by the RD calculator.

3. The dynamic scheduling system according to claim 2, wherein the CCU further comprises:

a plural of First In First Out (FIFO) buffers, each FIFO buffer storing the blocks with the same requested priority for one or more mobile station; and at least a Self-Clock Fair Queuing (SCFQ) server, each SCFQ server coupled to at least a FIFO buffer with the same requested priority, calculating a maximum delay for each block according to the corresponding maximum data service rate, and scheduling the blocks with the same requested priority based on the calculated maximum delays.

4. The dynamic scheduling system according to claim 3, wherein the CCU further comprises at least a First Come First Served (FCFS) server, each FCFS server coupled to a FIFO buffer storing the blocks with a specific requested priority not required of calculating the maximum delay.

5. The dynamic scheduling system according to claim 4, wherein the FCFS server stores the blocks with a highest requested priority in the CCU.

6. The dynamic scheduling system according to claim 4, wherein the FCFS server stores the blocks with a lowest requested priority in the CCU.

7. The dynamic scheduling system according to claim 3, wherein the SCFQ servers store the blocks with the constraints of maximum delays in the CCU.

8. The dynamic scheduling system according to claim 1, further comprising a Connection Admission Control (CAC) controller, receiving the set of parameters of each session from a mobile station and negotiating the maximum data service rate calculated by the RD calculator with the mobile station.

9. A dynamic scheduling method for time division multiple access (TDMA) mobile communication, comprising:
  detecting an interference level; and
  calculating a maximum data service rate for each block of requested sessions based on the interference level and a set of parameters for each block;
  wherein the set of parameters comprises a requested delay bound, number of blocks being transmitted, requested peak data rate, and acceptable minimum data rate.

10. The dynamic scheduling method according to claim 9, further comprising scheduling the blocks based on a requested priority of each block and the calculated maximum data service rates of the blocks.

11. The dynamic scheduling method according to claim 10, wherein scheduling the blocks further comprises:
  storing the blocks with the same requested priority for one or more user;
  calculating a maximum delay for each block according to the corresponding maximum data service rate, and scheduling a transmission order of the blocks with the same requested priority based on the calculated maximum delays.

12. The dynamic scheduling method according to claim 11, wherein scheduling the blocks further comprises storing the blocks with a specific requested priority not required of calculating the maximum delay.

13. The dynamic scheduling method according to claim 12, wherein the specific requested priority is a highest requested priority.

14. The dynamic scheduling method according to claim 12, wherein the specific requested priority is a lowest requested priority.

15. The dynamic scheduling method according to claim 10, further comprising storing the maximum data service rate and the acceptable minimum data rate for each session, and outputting the maximum data service rate if the detected interference level is low, else outputting the acceptable minimum data rate to prioritize the blocks if the detected interference level is high.

16. The dynamic scheduling method according to claim 9, further comprising receiving the set of parameters of each session from a mobile station and negotiating the calculated maximum data service rate with the user.

* * * * *